United States Patent [19]
Braun et al.

[11] 3,936,099
[45] Feb. 3, 1976

[54] CONSTRUCTION OF BEARING BOXES

[75] Inventors: Hans Braun, Herbede; Gerhard Mohn, Bergneustadt, both of Germany

[73] Assignee: Paul Kuhbier & Co., Wipperfurth, Germany

[22] Filed: Apr. 11, 1974

[21] Appl. No.: 460,066

[30] Foreign Application Priority Data
Apr. 14, 1973 Germany............................ 2318951

[52] U.S. Cl. ............... 308/15; 308/173; 308/DIG. 8
[51] Int. Cl.² ......................................... F16C 13/00
[58] Field of Search ......... 308/15, 20, 27, 173, 188, 308/189 R, 193, 195, 196, DIG. 7, DIG. 8, 202, 207, 212, 213

[56] References Cited
UNITED STATES PATENTS
3,806,213  4/1974  Nagai.................................. 308/207

Primary Examiner—M. Henson Wood, Jr.
Assistant Examiner—Gene A. Church
Attorney, Agent, or Firm—Michael J. Striker

[57] ABSTRACT

Two shell sections are injection molded of synthetic plastic material having high compression strength, to provide a housing for an outer race surface of a ball bearing or roller bearing. When the two sections are combined, inner surfaces of the housing provided thereby accurately fit bearing race surfaces to be held therein without machining or finishing these surfaces.

16 Claims, 18 Drawing Figures

CONSTRUCTION OF BEARING BOXES

BACKGROUND OF THE INVENTION

The invention relates to a bearing box which provides a housing for thrust bearings, radial bearings, self-aligning bearings and other types of bearings, the bearing box being formed of a plurality of shell sections which can be fitted together to provide a housing for the bearing.

In the construction of ball bearings, roller bearings and the like, which have bearing races with intermediate bearing means therebetween, mainly for rapidly rotating shafts, it is generally usual to make the bearing boxes of cast iron, particularly gray iron, by casting, machining, finishing and combining two iron shell sections which jointly embrace an outer bearing race surface. The shell sections are generally held together by outer housings, which also are commonly made of cast iron.

In addition to a recess which fits an outer bearing race surface, such bearing boxes generally have sealing recesses for sealing rings. They also have additional recesses for interconnecting elements such as snap rings, lubricant channels, centering provisions and the like. All these are usually formed by machining and finishing operations, with removal of metal chips, after the metal-casting process. Similarly, the outer housings are generally provided with smooth and properly dimensioned inner surfaces, as well as bolt holes and the like, by separate machining and finishing.

Due to these machining and finishing operations, the production of the usual bearing boxes is rather expensive. Also, with the conventional ball and roller bearings, each dimension of the shaft or other rotor therein requires different bearing shells.

SUMMARY OF THE INVENTION

It is an object of the invention to reduce the costs indicated above.

It is a further object to provide a bearing box which is substantially finished by injection molding and which thereby substantially eliminates the cost of machining and finishing.

It is a further object to construct shell sections which can easily be adapted to different purposes, such as cooperation with thrust bearings, radial bearings and other types of bearings.

Still another object is to arrange the shell sections so that only a few manual operations are needed to adapt a bearing box to a variety of uses of the indicated type and also to a variety of shaft dimensions.

Generally, it is an object of the invention to substantially reduce the manufacturing cost of bearing boxes and also at the same time to reduce the cost of storage of elements for bearing boxes.

For these purposes a bearing box is made of a synthetic plastic having sufficient compression strength, for example of a polyvinylchloride or polyamide. The sections are made by injection molding, complete with all recesses therein, and so that the sections can be utilized without any machining or finishing.

It has been known for a long time to journal slowly rotating shafts and other rotors directly in frictional bearing sleeves made from polytetrafluoroethylene (sometimes called Teflon) or of other synthetic plastic materials having high compression strength. On the other hand, it has been axiomatic to persons skilled in the art of machine construction that synthetic plastics are not to be used as shell sections for bearing race means of ball bearings and roller bearings; particularly not for use with rapidly rotating shafts. It was universally believed that such bearing boxes made of plastic materials would be subject to strong vibrations, would become too hot, and would not have the required compression strength. It was said that the temperatures developing in synthetic plastic bearing materials, due to vibration of the bearing races, would approach the softening point of the synthetic plastic materials, whereupon the compression strength of this plastic material would be reduced to practically nil.

This opinion cannot be maintained with respect to a bearing box according to the present invention. As pointed out in greater detail hereinafter, the invention contemplates the use of polyvinylchloride, polyamide or polyethylene, and the use of such materials in fact is less conducive to vibrations than is the use of bearing boxes of identical shape made of cast gray iron. It will be shown that such materials have allowable compression characteristics which are entirely sufficient to support the allowable load of bearing race means for ball bearings and roller bearings therein.

The synthetic plastic bearing box has only low oscillation and vibration, or almost none, when it accurately encloses and holds the bearing races. Preferred forms of construction for this purpose will be described hereinafter. Fewer oscillations occur in a bearing box or housing of synthetic material than in one of cast iron, under otherwise equal conditions, and for this reason less heat is generated in a bearing box and housing of synthetic plastic material than in one of cast iron. In any event, the temperature prevailing in a bearing box unit according to the invention remains far below the softening point of the plastic material, even after weeks of uninterrupted service under unfavorable conditions.

The new method of fabrication wherein injection molding of synthetic plastic material is used allows the provision of breaking off elements and breaking off margins, by virtue of which it becomes possible to manually break off certain parts of a bearing box unit, which parts are not to be used in a particular bearing box. Such parts may for example comprise half discs for dust covers, one on each shell section of the bearing box. If the bearing box shall have a shaft projecting from it only toward one side, the half discs on that side are broken off, while the other side has a cover sealing the bearing against dust. Similarly, it is possible to break off other parts of a bearing box, for example, parts of smaller clear diameter than the remaining parts. It is also possible by virtue of the invention to construct a bearing box in a form which allows selective use of insert rings or outer housings, in such a way that the same injection molded bearing box can hold a self-aligning bearing or a prealigned bearing, which can be a thrust bearing, a radial bearing or a bearing of other design. The cost of producing and of storing bearing box elements is thereby materially reduced.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Referring first to FIGS. 1 to 4, an outer housing element 1 will be seen to have flanges thereon for mounting this element on a vertical surface, not shown, by bolting the element to said surface with the aid of bolts which are received in bolt holes 7, 8. According to the invention, two molded shell sections 2 and 3, both having generally semicylindrical form and jointly providing a bearing box, are inserted in housing 1 with a snug fit therein. They are held against axial displacement by a snap ring 4 which fits into a groove 401 around the outer semicircular surfaces of shell sections 2 and 3, and also fits into a groove 9 in an inner circular surface of the housing 1. In order to also prevent circumferential displacement of the bearing box relative to the housing, one of the shell sections, in the drawing the upper section 2, has a stop cam 5 radially projecting therefrom and received in a correspondingly formed recess 6 in an inner surface of housing 1. These cam and recess elements additionally serve to make sure that the bearing shells are inserted in housing 1 in the proper orientation and arrangement.

The housing 1 and the shell sections 2 and 3 as shown consist of synthetic plastic material and are produced in finished form, so that substantially no machining or machine finishing is required to provide the mating inner surface in housing 1 and the outer surfaces on shell sections 2 and 3; the flat mounting surface on housing 1; the bolt holes 7 and 8; the annular grooves 9 and 401 for snap ring 4; semicircular seal recesses 13 and 13a at both ends of the upper shell 2; corresponding recesses 14 of the lower shell; semicylindrical recesses 15, 16 in the upper and lower shells 2 and 3 respectively for shaft 11 which is guided by ball bearing 12; and mainly the generally semicircular recesses 10 and 11 in shells 2 and 3, which jointly fit an outer bearing race surface 12a of ball bearings 12.

Figure 13:
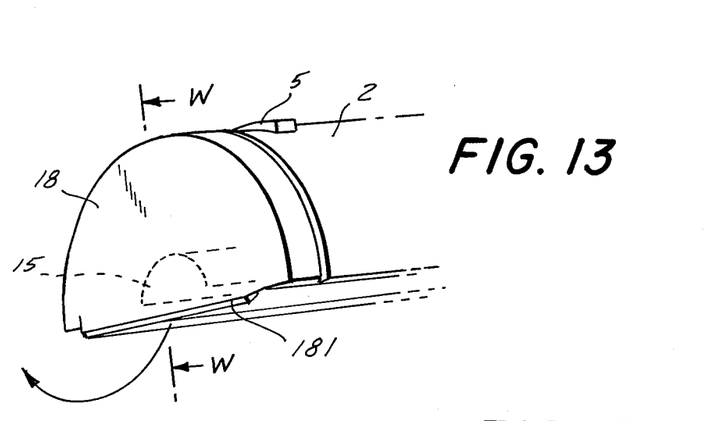
FIG. 13 is a perspective view of a detail of FIG. 12.
Figures 14, 15:
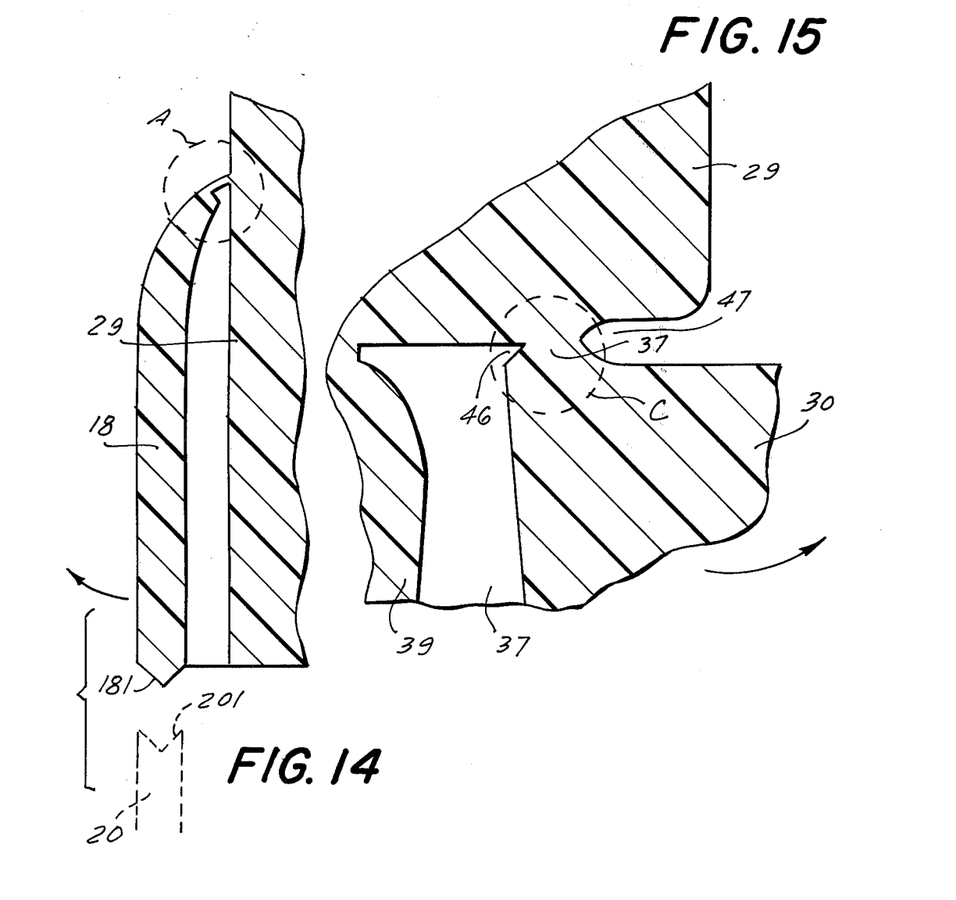
FIG. 14 is an enlarged sectional view taken on line W—W in FIG. 13 and showing the detail A of FIG. 12.
FIG. 15 is an enlarged sectional view showing the detail C of FIG. 7.

In further accordance with the invention the shell section 2 has at both ends thereof a half disc 18, 19, while section 3 similarly has half discs 20, 21. The half discs extend across the semicylindrical recesses 15, 16, and have outer peripheral portions of substantially reduced thickness, as best shown in FIG. 14 at A. By manually gripping diametrical opposite edge portions 181 of such a half disc 18 and pressing the same outwardly as indicated by the curved arrows in FIGS. 13 and 14, the half disc can be removed by breaking it off. For example, in order to provide the bearing of FIG. 1, all four of the half discs 18 and 21 are so removed; however, as will be noted presently, one set of half discs can be left in place when the shell sections are used in the construction of a different type of bearing.

Figures 1, 2:
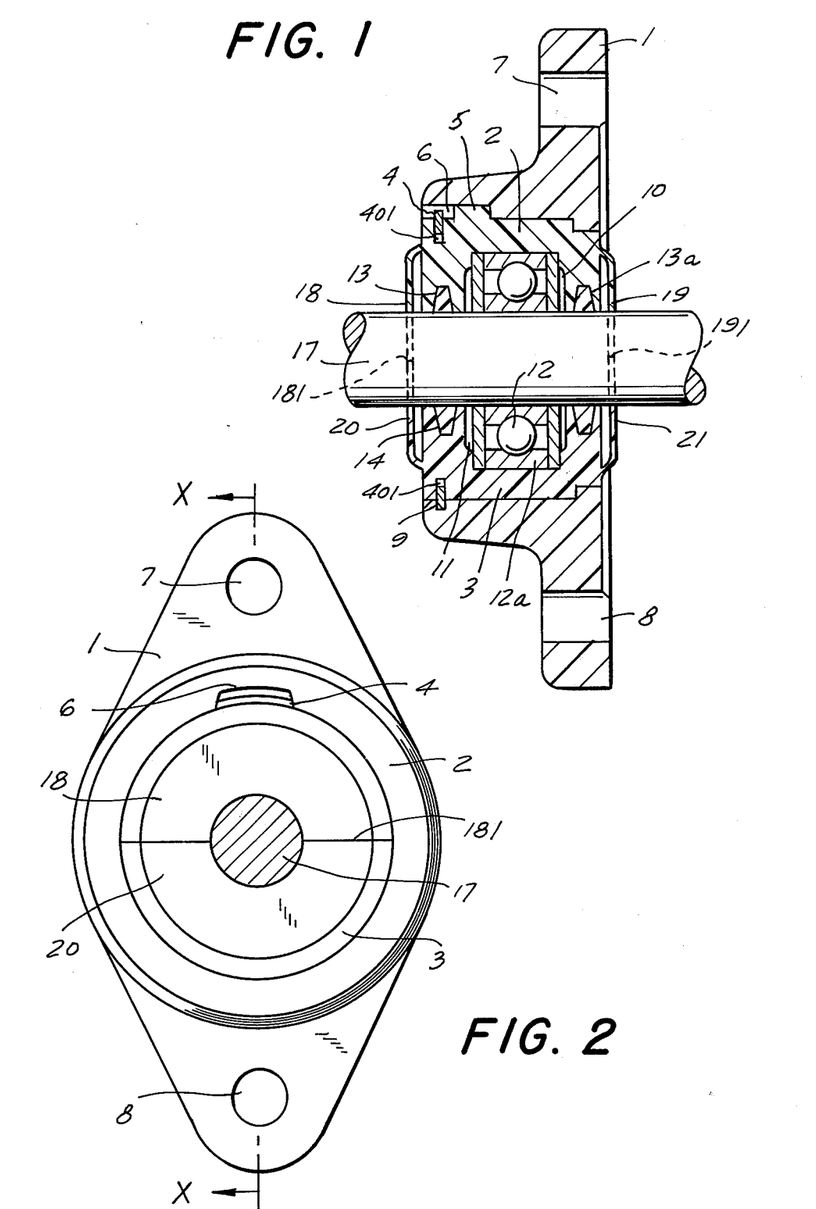
FIG. 1 is a sectional view of a first embodiment of the invention taken on line X—X in FIG. 2.
FIG. 2 is a front view of this embodiment.
Figure 3:
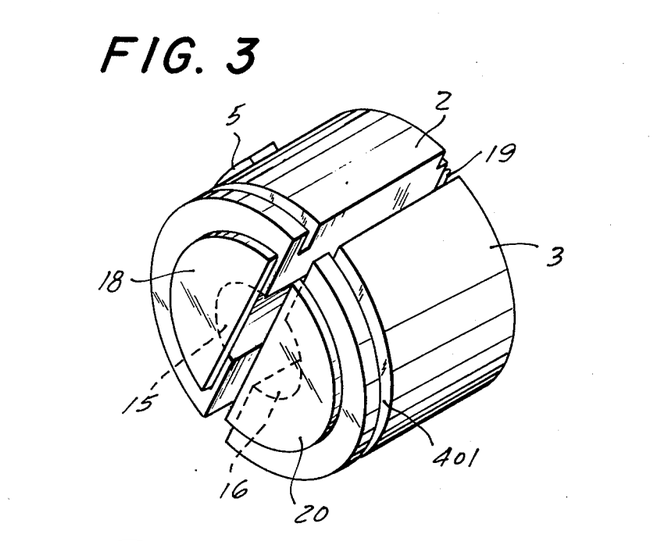
FIG. 3 is an exploded perspective view of a detail of this embodiment.
Figure 4:
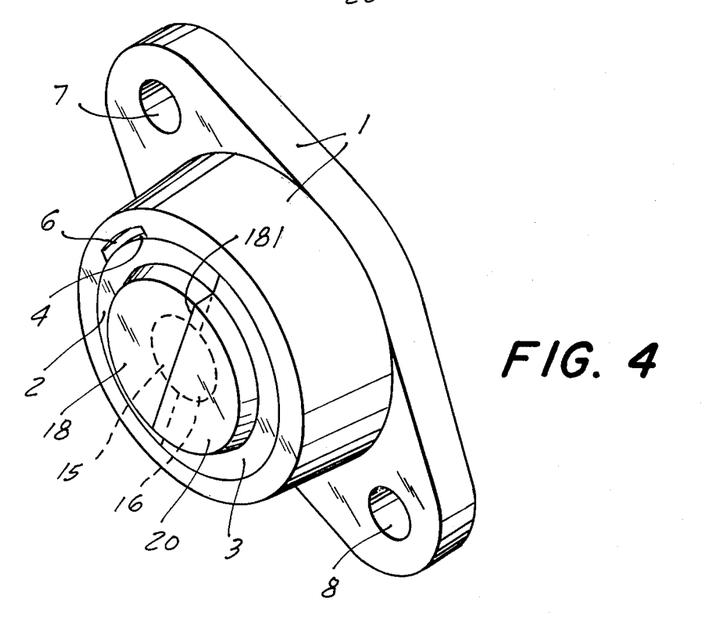
FIG. 4 is an assembled perspective view of the same embodiment.
Figure 5:
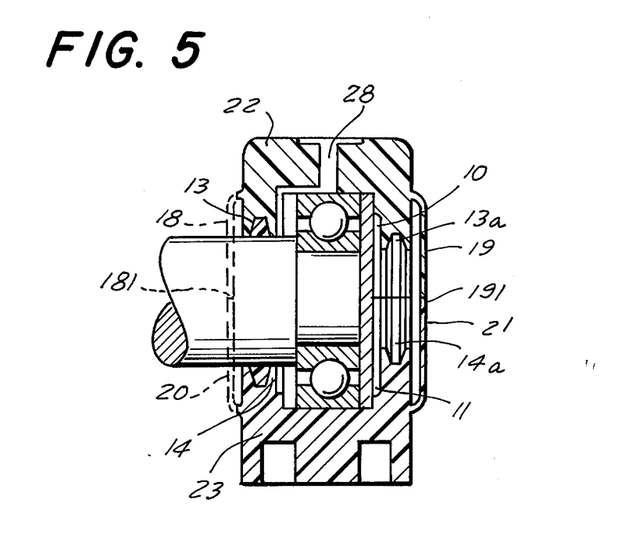
FIG. 5 is a sectional view of a second embodiment taken on line Y—Y in FIG. 6.
Figure 6:
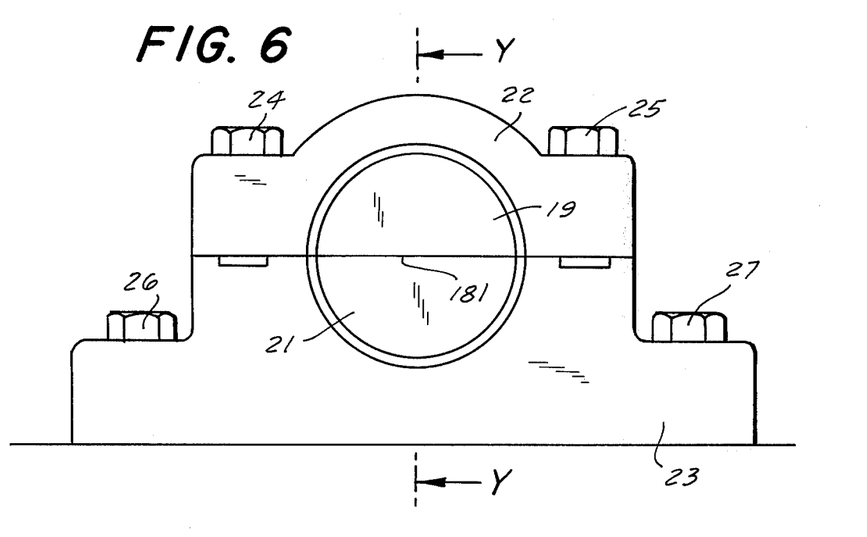
FIG. 6 is a front view of the embodiment of FIG. 5.

Referring to FIGS. 5 and 6, it will be noted that upper and lower shell sections 22, 23 are here constructed to jointly form a pillow block for the same ball bearing race means which have been shown in FIG. 1 to 4. The shell sections are again injection molded, for example from polyvinylchloride. The are here held together by a pair of bolts 24, 25, and the lower shell section 23 is secured to a base surface by two further bolts 26, 27; both shell sections are formed with flanges thereon to provide mounting surfaces for these bolts 24 to 27. In addition to the aforementioned surfaces and recesses formed by molding the inner surface portions of the shell sections, this embodiment also includes additional recess means 28 for guiding lubricant to the ball bearing. While again four half discs 18 to 21 are provided as part of the molded sections 22 and 23, only one pair of such discs, namely 18 and 20, is removed to allow for introduction of the shaft 117. The other pair of half discs 19, 21 in this case remains in place, as indicated in FIG. 5, at right. As further indicated in FIG. 14, upper and lower half discs of such remaining pair of half discs can be interengaged by tongue and key elements 181, 201, shown as having wedge-like cross section. Thus the access of dust to the ball bearing is prevented, at the right-hand end of FIG. 5, by the interengaged half discs 19 and 21 and at the left-hand end by seal rings lodged in seal chambers 13 and 14.

As further shown in FIG. 5, shaft 117 has a reduced end portion whereon the inner race of the illustrated, radial ball bearing is mounted, the diameter of shaft 117 being larger than that of the reduced portion. As also shown, the bearing of FIG. 5 has seal rings 13a, 14a installed in the right ends of its shell sections 22 and 23 which are of smaller diameter than the seal rings 13, 14 in the left end of the bearing box. Thus it becomes possible to use the same bearing box 22, 23 for shafts of different diameter by breaking off the dust-cover half discs 19 and 21 instead of the dust-cover half discs 18 and 20.

Figure 7:
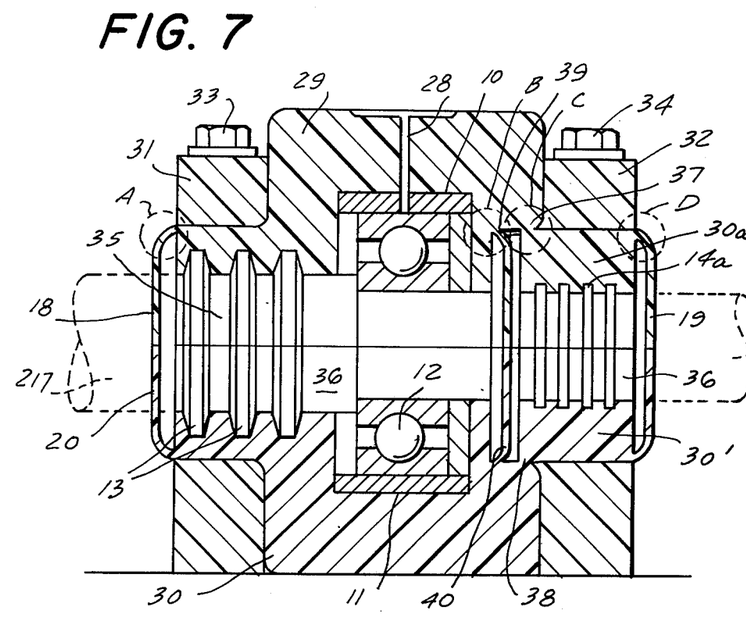
FIG. 7 is a sectional view of a third embodiment taken on line Z—Z in FIG. 8.
Figure 8:
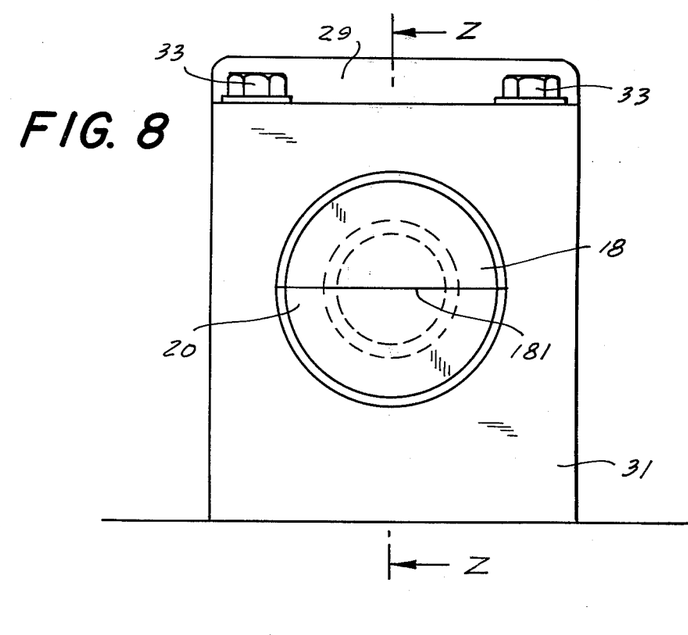
FIG. 8 is a front view of the embodiment of FIG. 7.

Various types of bearing units with various shaft diameters can be constructed by means of the third embodiment of the invention shown in FIGS. 7 and 8. In these Figures, shell sections 29, 30 are shown which provide a longer pillow block bearing box than the one of FIG. 5. Upper and lower shell sections 29 and 30, as shown in FIGS. 7 and 8, are held together by a housing 31 at one of their ends and by a housing 32 at the other end, these housings being mounted on a horizontal mounting surface by means of bolts 33, 34. Half-cylindrical recesses for a shaft 217 or 217' are shown here at 35 and 36, in addition to seal ring chambers 13, 14, bearing race receiving chambers 10 and 11 and dustcover half discs 18 to 21. The two shells 29, 30 and the two housings 31, 32 again are injection molded of synthetic plastic material. As in FIG. 5, two different shafts 217, 217' of different diameters can be employed, or it is possible to mount ball bearings 12 on a shoulder between a shaft portion 217 of larger diameter, and a reduced-diameter portion 217' of the same shaft, as indicated. Additionally, it is possible in this embodiment to provide for breaking off of a bearing box portion, for example portion 30a shown at the right end, by use of reduced thicknesses of material in annular areas 37, 38 thereof, as best shown in FIG. 15, thereby removing not only one pair of dustcover half discs 19, 21 (FIG. 7) but also the bearing box portion 30a which has the seal ring recesses 14a formed therein. Inner dustcover half discs 39, 40 are provided in order to make it possible to seal the right hand end of the bearing box after removal of its terminal portion 30a. Alternatively, both outer and inner half discs 19, 21 and 39, 40 can be removed while portion 30a remains in place; the latter half discs can then be broken off with the aid of a screw driver or the like. This can also be done if the unit of FIG. 7 is initially used with end section 30a thereon and is later to be used without this end section, or in any case without half discs 39, 40. The break zones of these half discs are indicated by circles A, B and D, while the break zone for portion 30a is indicated by circle C.

Figures 9, 10, 11:
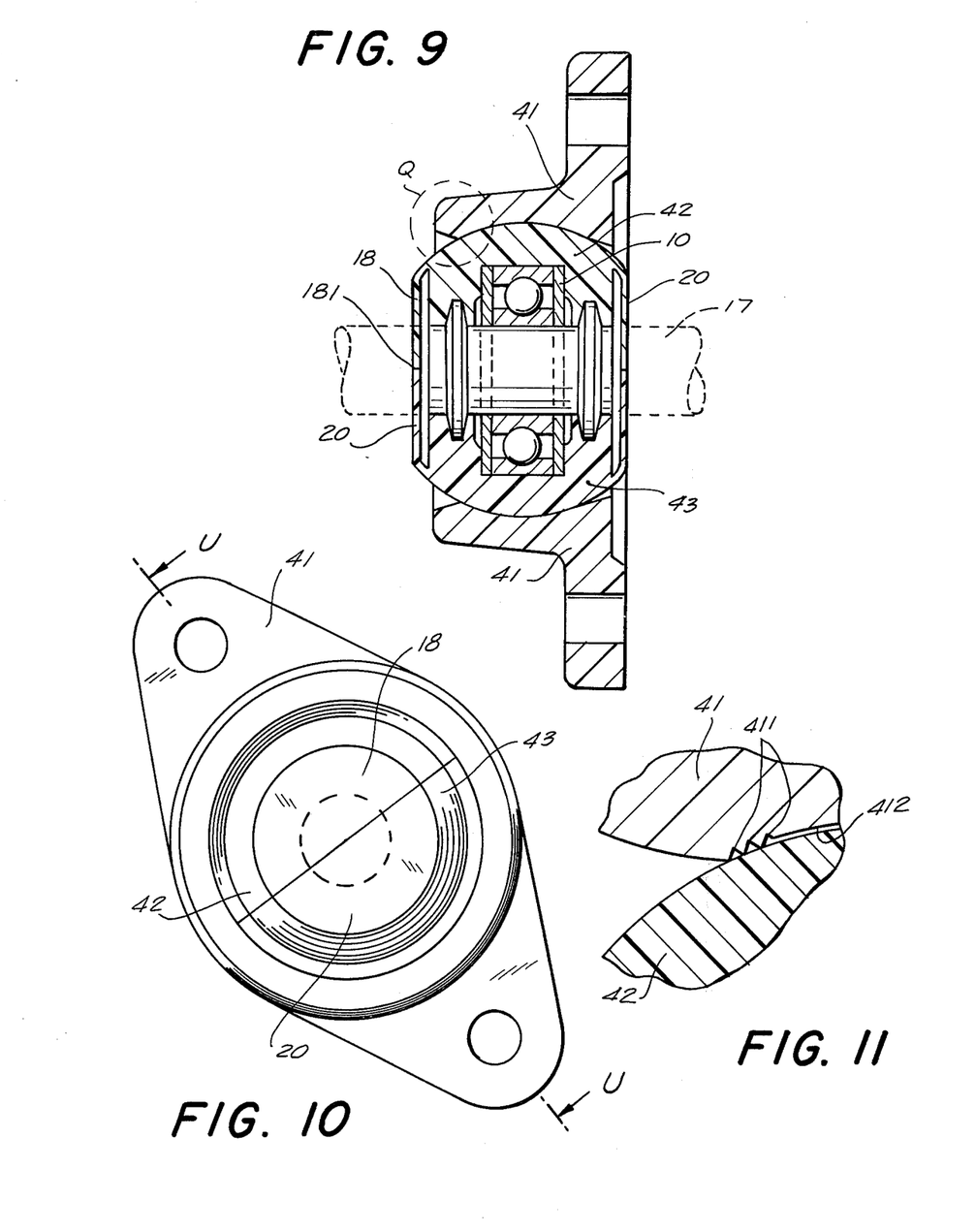
FIG. 9 is a sectional view of a fourth embodiment taken on line U—U in FIG. 10.
FIG. 10 is a front view of the embodiment of FIG. 9.
FIG. 11 is an enlarged sectional view of a detail Q in FIG. 9.

A self-aligning radial bearing unit according to the invention is illustrated in FIGS. 9 to 11. Here an outer housing 41 is provided which is generally similar to housing 1 of FIG. 1 but has a spherically-shaped surface 412 therein. Correspondingly, outer surface portions of shell sections 42, 43 are shaped in convex hemispherical forms. Again, all surfaces can be produced and finished by injection molding of synthetic plastic material. Incident to pivoting of shaft 17, spherical surface 412 and the mating outer surfaces of the shell sections, all being plastic, slide on one another, thereby making sure that a minimum of oscillation is generated by the pivoting movement.

Shells 42, 43 are, in this embodiment, inserted in housing 41 by axial movement, preferably from the left side as shown in FIG. 9 and in direction towards the right side. A housing portion 412 projecting toward the left side from the flanges 413 is then subjected to slight elastic yielding, which is possible by virtue of the use of synthetic plastic material. The insertion of the shell sections is further facilitated by forming small annular grooves 411 in the left end portion of the inner surface 412. It will be understood that the illustration of this embodiment, as well as the entire drawing, is purely schematic and is not intended to show actual dimensions or proportions.

Figure 12:
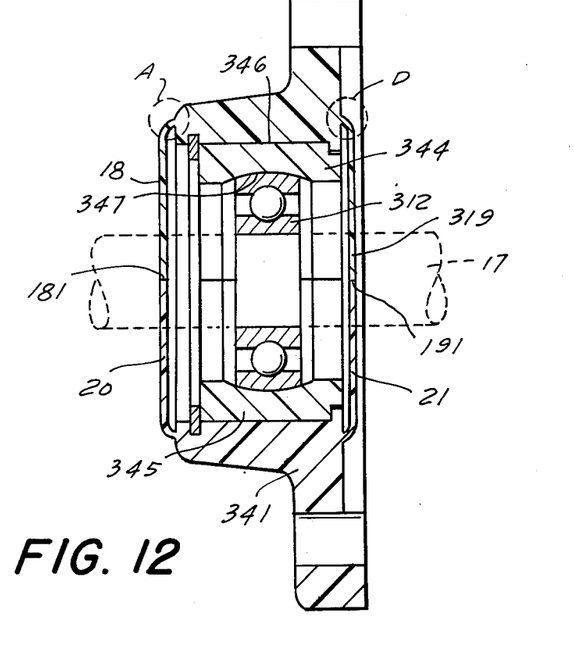
FIG. 12 is a sectional view through a fifth embodiment taken on line W—W in FIG. 13.

It is also possible, as shown in FIG. 12, to modify the construction of the self-aligning bearing. In this event the upper and lower shell sections have semicylindrical outer surfaces 345 and hemispherical inner surfaces 346. Interengagement of synthetic plastic and steel surfaces is provided on the latter surfaces. The construction and assembling of the unit in accordance with this modification is, in many cases, simpler than the one according to FIG. 9 as all parts can be assembled without the use of pressure and elastic yielding. It is also possible to utilize a complete cylindrical shell 52 (FIG. 18) instead of the half shells 344, 345, and to make this shell 52 elastic enough to facilitate insertion of the outer bearing race surface portions with the suitable axial pressure.

Figure 17:
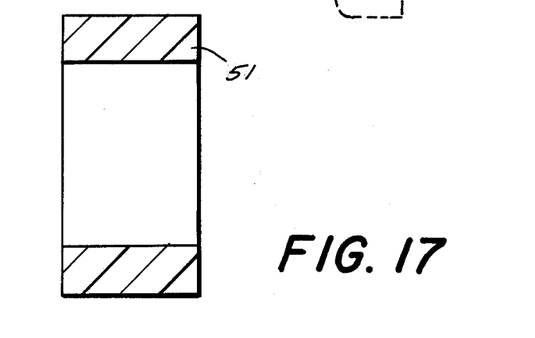
FIG. 17 shows a detail of FIG. 12 in a modified form.
Figure 18:
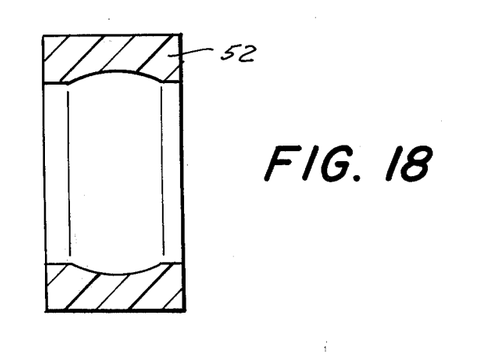
FIG. 18 shows this detail by itself.

In lieu of the bearing shell 52 with an inner spherical surface, as shown in FIG. 18, it is of course possible to use a bearing shell 51 with cylindrical outer and inner surfaces, as shown in FIG. 17.

Figure 16:
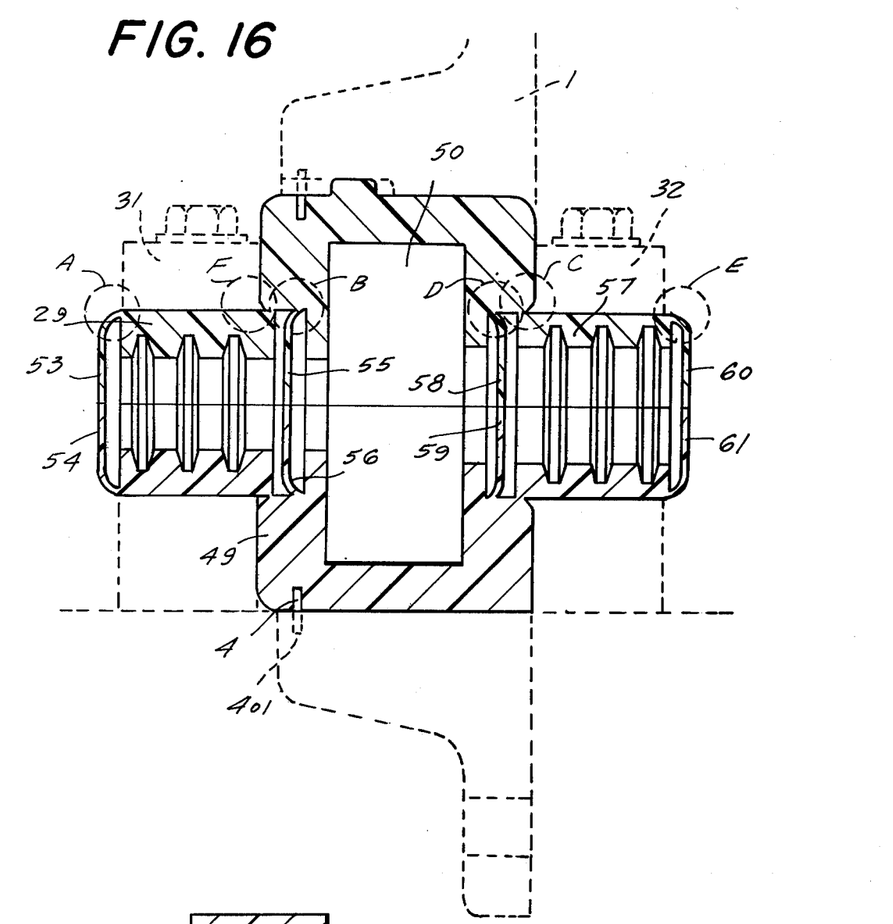
FIG. 16 substantially shows the embodiment of FIG. 7 in a modified orientation and arrangement.

The possibilities of providing large numbers of variants of bearing units by means of a limited number of embodiments of the invention can be explained further by reference to FIG. 16. Here, the shell sections are identified as 48 and 49 with bearing chamber 50. This chamber can have mounted therein a ring insert 51 with exterior and interior cylindrical surfaces for the construction of prealigned bearings, or a ring insert 52 with a concave spherical inner surface (FIG. 18) for the construction of a self-aligning bearing. It is also possible to break off the half discs 53 and 54, or 55 and 56, or both sets, or the corresponding half discs 58, 59 and/or 60, 61 at the opposite end of the unit, depending on whether the bearing unit shall guide a shaft of large diameter projecting toward one side, or toward the other side, or a shaft of two different diameters projecting toward both sides. The bearing shells can be mounted in a flanged housing 1 or in pillow block housings 31, 32. By these modifications of a single embodiment of the invention as shown in FIG. 16 (and essentially also in FIG. 7, the cost of construction and storage of bearing elements is very materially reduced.

It will be appreciated in view of the foregoing explanations that pursuant to the invention, the opinion thus far held by persons skilled in the art regarding the limited applicability of synthetic plastic materials for bearings can no longer be maintained. In addition to the plastic bearings for relatively slowly rotating shafts, used up to now, bearing boxes can hold the ball bearings and roller bearings of rapidly rotatable shafts in accordance with the invention. Long term tests have shown that the new bearing boxes have considerably lower oscillation than the usual cast metal bearing boxes, so that their temperature rises considerably less by virtue of the use of proper plastic material. As mentioned initially, these two characteristics depend on one another. Oscillations generate heat and the heat generated by oscillations is greater than the heat generated by friction under otherwide equal conditions.

It has previously been believed that bearing boxes consisting of synthetic plastic material do not have the required compression strength. This opinion has been based on the assumption that the plastic bearing box would heat up to a high degree in continued use. As has been noted, this is not the case. It can be shown that the compression strength of a bearing box made of synthetic plastic is entirely sufficient to withstand the allowable maximum load of commercially used ball bearings. A shaft of 20-mm diameter corresponds to a bearing surface of 5.2 square centimeters in a bearing of the usual length. The allowable compression load of suitable synthetic plastic materials—such as polyvinylchloride of the type "NP" made by Farbwerke Hochst, Frankfurt, Germany, and polyamide of the type known as "Durethan-BK" made by BASF in Ludwigshafen, Germany—is 390 kiloponds per square centimeter and 440 kp/cm$^2$, respectively. Admittedly, this is less than the admissible load for cast gray iron of type 26, which is 750 kp/cm². However, the compression strength of the aforementioned synthetic plastics in a bearing having 5.2 cm² of surface amounts to $5.2 \times 390 = 2328$ kp and $5.2 \times 440 = 2300$ kp for the said polyvinylchloride and polyamide, respectively. The maximum allowable load for the corresponding ball bearing is 1000 kp. Thus the aforementioned materials provide two times or more than two times the allowable strength. Even if cast iron provides about four times the allowable strength, it is in many instances technically preferable to use the synthetic plastic bearing boxes according to the invention, in view of their considerable advantages as to vibratory characteristics and as to manufacturing costs.

The cost of injection molding in the production of the synthetic plastic shell sections and housings in accordance with the invention is minimal. This is due to the fact that the more or less complex inner surfaces of the shell sections and housings are open toward one side or one end. No trouble is encountered in producing the illustrated cavities, break-off portions and other parts. By means of the resulting truly universal bearing boxes and housings, units can be provided in standardized form, which are easily adapted to each use by breaking off superfluous parts interfering with the individual use of the unit. In most instances, all machining and machine finishing operations can be omitted in the use of the new bearing box and housing in marked contrast to the conventional bearing boxes and housings of cast metal, such as cast gray iron.

It will be understood that each of the elements described above, or two or more together, may also find a useful application in other types of bearing boxes differing from the type described.

While the invention has been illustrated and described as embodied in a construction of bearing boxes, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A bearing box comprising a plurality of shell sections substantially consisting of synthetic plastic material and jointly defining a recess for fitting bearing race means therein, and additional recesses coaxial with said recess for said bearing race means; and seal ring means in said additional recesses.

2. A bearing box comprising a plurality of shell sections substantially consisting of synthetic plastic material and jointly defining a recess for fitting bearing race means therein, at least one of said shell sections have additional recess means for guiding lubricant fluid to said bearing race means.

3. A bearing box as defined in claim 2 wherein said portion is a half disc for sealing the bearing recess against dust.

4. A bearing box as defined in claim 3 wherein one of said sections has diametric groove means fitting a diametric edge of said half disc.

5. A bearing box comprising a plurality of shell sections substantially consisting of synthetic plastic material and jointly defining a recess for fitting bearing race means therein, each of said sections having a portion fitting one type of bearing race means such as the outer race of a thrust bearing, said portion having a thin peripheral element connecting said portions to another part of the section to permit breaking off of said portion so that said other part fits another type of bearing race means such as the outer race of a radial bearing.

6. A bearing box comprising a plurality of shell sections substantially consisting of synthetic plastic material and jointly defining a recess for fitting bearing race means therein; and annular inset means in said recess and having a spherically curved inner surface to fit self-aligning bearing race means.

7. A bearing box comprising a plurality of shell sections substantially consisting of synthetic plastic material and jointly defining a recess for fitting bearing race means therein; and annular inset means in said recess and having a cylindrically curved inner surface to fit preadjusted bearing race means.

8. A bearing box comprising a plurality of shell sections substantially consisting of synthetic plastic material and jointly defining a recess for fitting bearing race means therein; a housing surrounding said shell sections and holding the same so that they jointly define said recess, said housing having a spherically curved inner surface and said shell sections having spherically curved outer surfaces for self-alignment of said bearing race means.

9. A bearing box comprising a plurality of shell sections substantially consisting of synthetic plastic material and jointly defining a recess for fitting bearing race means therein; a housing surrounding said shell sections and holding the same so that they jointly define said recess, said housing and one of said shell sections having key and groove means for holding said sections against displacement relative to said housing.

10. A bearing box as defined in claim 9 including a housing surrounding said shell sections and holding them so that they jointly define said recess.

11. A bearing box as defined in claim 10 wherein said housing substantially consists of synthetic plastic material.

12. A bearing box as defined in claim 9 wherein said material is a polyvinylchloride.

13. A bearing box as defined in claim 9 wherein said material is a polyamide.

14. A bearing box as defined in claim 9 wherein said material is a polyethylene.

15. A bearing box as defined in claim 9 wherein said shell sections are injection molded to provide said shape and dimensions.

16. A bearing box comprising a plurality of shell sections substantially consisting of synthetic plastic material having a compression strength of at least about 390 kiloponds per square centimeter and jointly defining a recess for fitting bearing race means therein.

* * * * *